(No Model.)
P. HILL.
DUST PAN.
No. 490,200. Patented Jan. 17, 1893.
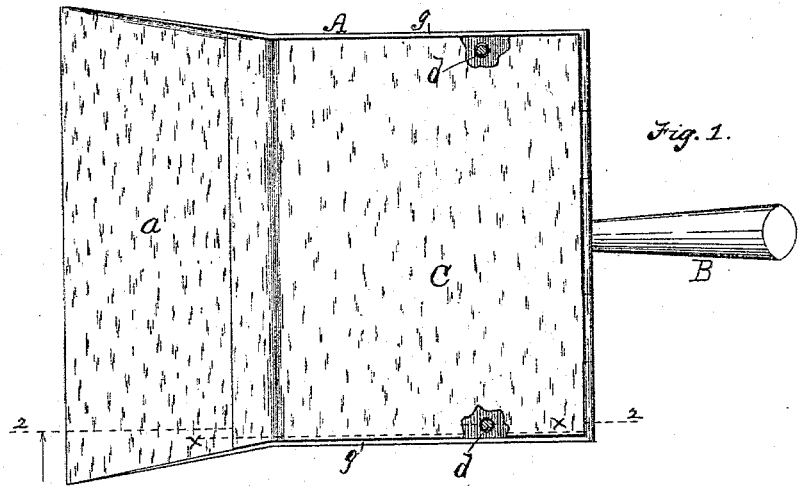
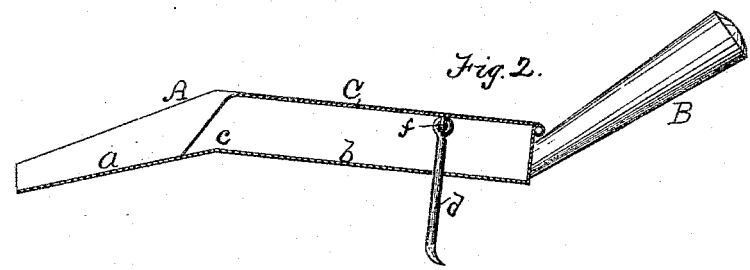
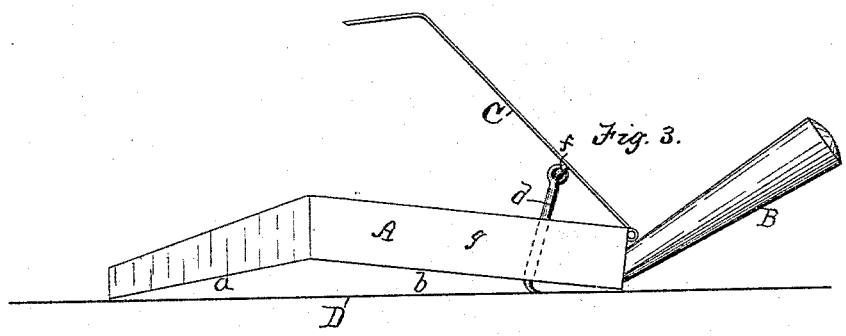
Attest
M. L. McDermott.
O. F. Heidle.
Inventor:
Peter Hill,
By E. B. Whitmore, Atty.

UNITED STATES PATENT OFFICE.

PETER HILL, OF NEWARK, NEW YORK, ASSIGNOR OF TWO-THIRDS TO WILLIAM B. ROCHE AND MORGAN ROCHE, OF SAME PLACE.

DUST-PAN.

SPECIFICATION forming part of Letters Patent No. 490,200, dated January 17, 1893.

Application filed October 14, 1892. Serial No. 448,881. (No model.)

*To all whom it may concern:*

Be it known that I, PETER HILL, of Newark, in the county of Wayne and State of New York, have invented a new and useful Improvement in Dust-Pans, which improvement is fully set forth in the following specification and shown in the accompanying drawings.

My invention is a dust pan formed with a receptacle closed by a hinged cover by means of which the dust collected in the pan is covered while the pan is being carried or moved about, means being provided to cause the cover to rise when the dust pan is placed upon the floor to receive the dust, and to close when the dust pan is raised from the floor.

The invention is hereinafter fully described and particularly pointed out.

Referring to the drawings Figure 1 is a plan of my improved dust pan with parts of the cover broken out. Fig. 2 is a vertical section on the dotted line 2 2 in Fig. 1, the cover being sectioned on the dotted line *x x*. Fig. 3 is a side elevation showing the pan when upon the floor and ready to receive the dust.

Referring to the parts shown, A is the body of the pan, and B the handle. The floor of the pan is made of two oppositely inclined planes, *a b*, each touching the part or ridge *c* between them being some distance above the floor, as shown.

The front part of the dust pan is preferably made flaring and with a broad edge as shown in Fig. 1. The dust is swept up the incline *a* and over the ridge onto the rear downward incline *b*, which rear part of the pan forms a receptacle for the collected dust.

Over the rear part of the pan is placed a closely fitting cover C hinged to the upper rear edge of the pan, as shown, in a manner to swing in a vertical direction. To the under surface of this cover and near its sides are secured two equal lifters *d d*, which extend down through holes in the floor of the pan, as shown, to meet the carpet or floor D of the room. These lifters are preferably simple pieces of iron wire hung in loops or eyelets *f f* rigid with the cover C, so as to move freely therein. The lower ends of the lifters where they come in contact with the floor D, are slightly retroverted so as to move more smoothly over the floor or carpet as the dust pan is pushed forward thereon.

It will be understood by inspecting the drawings that when the pan is placed upon the floor, as shown in Fig. 3, for the purpose of receiving the dust collected by a broom the lower ends of the lifters coming in contact with the floor, will cause the cover to rise and assume the position shown. This admits of the dust being swept back onto the rear incline *b* under the cover C. And, also, when the dust pan is raised from the floor the weight of the cover will cause it to close upon the pan and so confine the dust and thus prevent its being scattered by currents of air while the pan is being carried from place to place. The front edge of the cover is bent downward to meet the forward incline *a* of the floor of the pan to perfectly inclose the collected dust. The edges or sides of the cover drop just within the vertical sides or walls, —*g*—*g*, of the pan, so as to make close joints with said walls.

What I claim as my invention, is:

1. A dust-pan having its floor formed into two contrary inclined planes or slopes and a hinged cover over the rear slope, in combination with lifters for the cover extending downward through the space within the dust-pan and through the floor of the latter to touch the carpet beneath the dust-pan, substantially as shown and described.

2. A dust-pan having its floor formed into two contrary slopes, and a hinged cover over the rear slope, in combination with lifters for the cover secured to the latter and extending down through the floor of the pan, the lower ends of said lifters being retroverted, substantially as shown and described.

In witness whereof I hereunto set my hand, this 26th day of September, 1892, in the presence of two subscribing witnesses.

PETER HILL.

Witnesses:
HENRY LEE,
MORGAN ROCHE.